J. A. HATHAWAY.
VEGETABLE CUTTER.
APPLICATION FILED MAY 3, 1916.
1,249,752.
Patented Dec. 11, 1917.
2 SHEETS—SHEET 1.
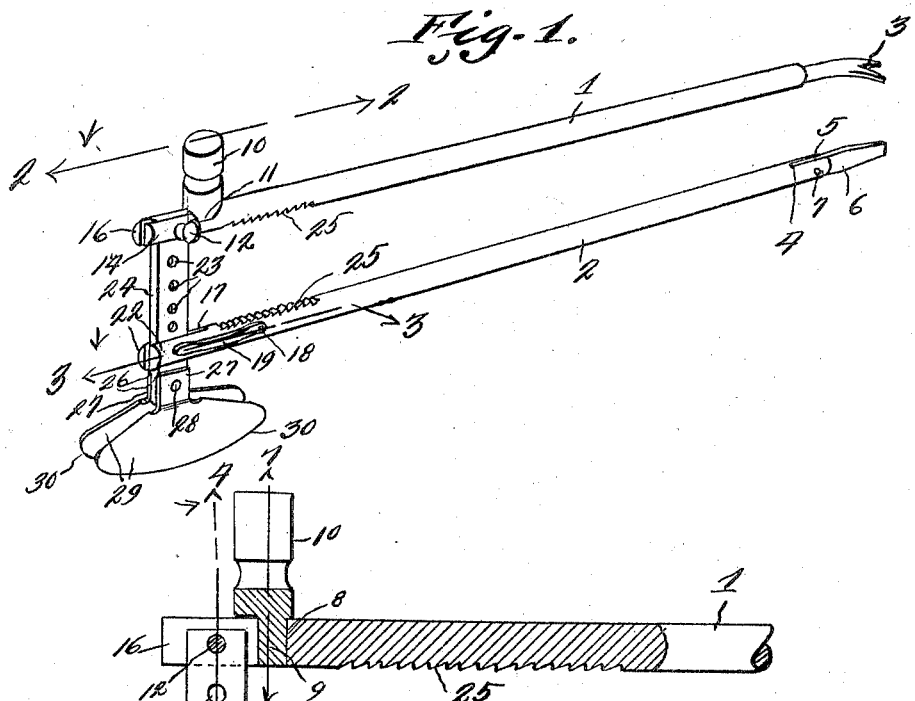
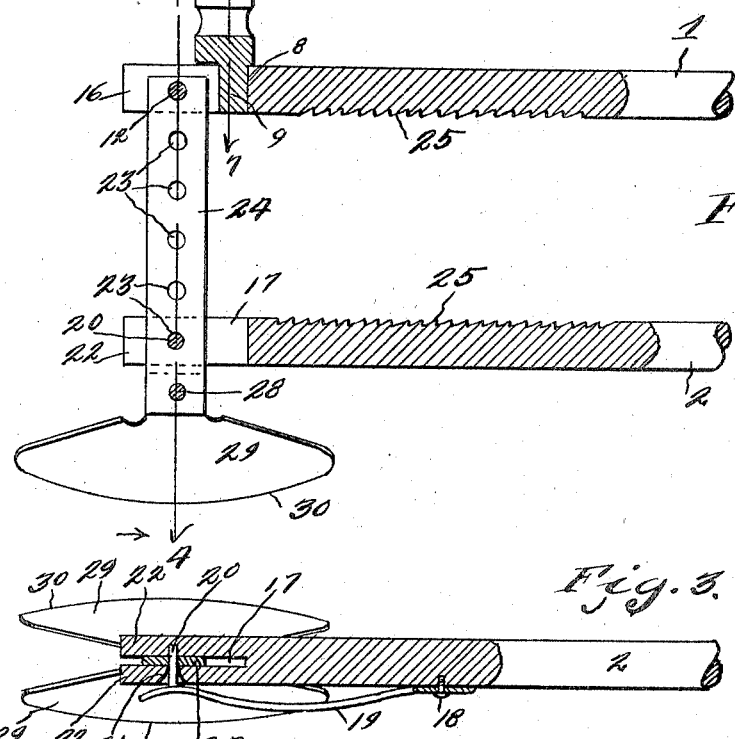
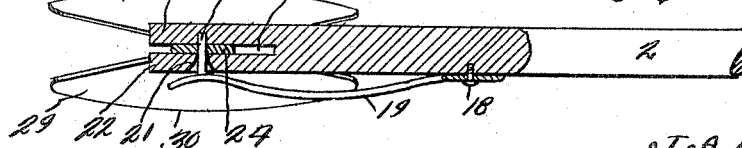
Witnesses
Inventor
J. A. Hathaway
By D. Swift & Co.
Attorneys J. A. HATHAWAY.
VEGETABLE CUTTER.
APPLICATION FILED MAY 3, 1916.
1,249,752.
Patented Dec. 11, 1917.
2 SHEETS—SHEET 2.
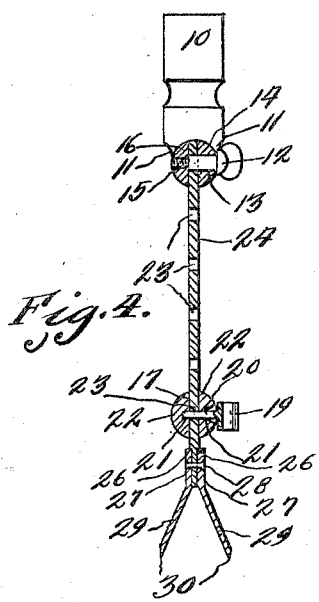
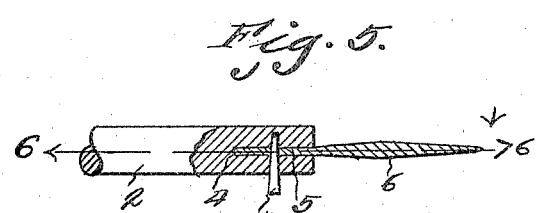
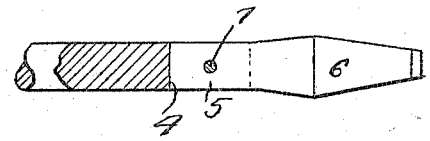
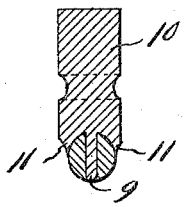
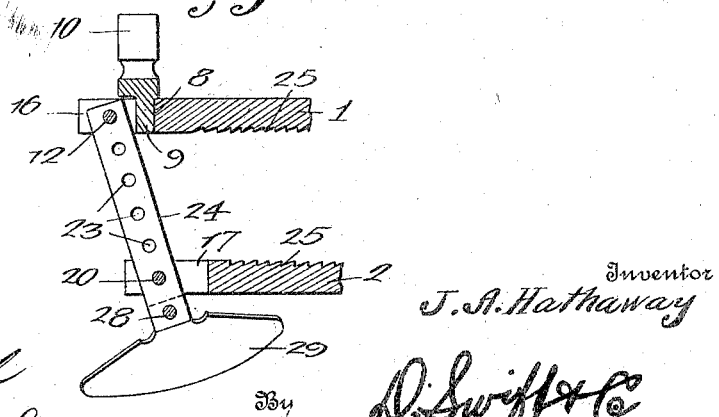
Inventor
J. A. Hathaway

UNITED STATES PATENT OFFICE.

JAMES A. HATHAWAY, OF POMONA, CALIFORNIA.

VEGETABLE-CUTTER.

1,249,752. Specification of Letters Patent. Patented Dec. 11, 1917.

Application filed May 3, 1916. Serial No. 95,183.

*To all whom it may concern:*

Be it known that I, JAMES A. HATHAWAY, a citizen of the United States, residing at Pomona, in the county of Los Angeles, State of California, have invented a new and useful Vegetable-Cutter; and I do hereby declare the following to be a full, clear, and exact description of the invention, such as will enable others skilled in the art to which it appertains to make and use the same.

This invention relates to an improved vegetable cutter and an object of the invention is to provide a device of this kind having a pair of opposing handles, whereby cutting members may be held so that different portions of the cutting edges of said members may be presented toward the material or vegetables to be chopped.

Another object of the invention is the provision of a connector pivotally connecting said opposing members or handles, whereby the members may be adjusted toward and from each other, and both movable substantially in parallelism relative to each other, said connector at one end terminating in a pair of knives, which diverge from each other, and are provided with cutting edges which are curved as shown in side elevation of the tool.

Another object of the invention is to provide an improved vegetable cutter, comprising two handle members to be held substantially in parallelism to each other. In connection with said handle members, a transverse link or bar is provided, and its lower end has secured thereto cutting members, which diverge from each other and are elongated. It is to be observed that one of the handle members is connected to the link or bar adjacent the cutters, so that fairly considerable pivotal movement may be attained. However, the other handle member is connected to the upper end of said link or bar, as shown at 12, in order to afford a somewhat limited pivotal movement and furthermore, the movement of said handle member is not to be prevented by the rectangular shoulder of the hammer poll, to the extent of preventing said handle member from performing its necessary functions. For example, both handle members may be moved longitudinally relatively to each other in order to change the angle of said link or bar, whereby different portions of the cutting edges of the cutting members of the lower end of the link may be presented toward the material or vegetables to be chopped. In this way, the entire cutting edges of both cutters may be utilized without tilting the handle of the implement to any unnecessary great degree. The recess in the hammer poll, which provides the aforesaid shoulder is not to be, nor is it constructed, whereby the aforesaid shoulder will prevent the necessary pivotal action of the handle member.

Another object of the invention is the provision of means for adjusting the connector.

In practical fields the details of construction may necessitate alterations falling within the scope of the appended claims.

The invention comprises further features and combinations of parts, as hereinafter set forth, shown in the drawings, and claimed.

In the drawings,

Figure 1 is a view in perspective of the improved vegetable cutter constructed in accordance with the invention.

Fig. 2 is a sectional view on line 2—2 of Fig. 1.

Fig. 3 is a sectional view on line 3—3 of Fig. 1.

Fig. 4 is a sectional view on line 4—4 of Fig. 2.

Fig. 5 is a sectional view through one end of one of the jaw members showing the means for detachably fastening a screw driver, or similar tool, in place.

Fig. 6 is a sectional view on line 6—6 of Fig. 5.

Fig. 7 is a sectional view on line 7—7 of Fig. 2.

Fig. 8 is a detail view showing the members 1 and 2 and the connecting link 24 in different positions.

Referring more especially to the drawings, 1 and 2 designate two jaw members, which are elongated, as shown. The rear end of the member 1 terminates in a tack puller 3, while the corresponding end of the member 2 is provided with a bifurcation 4 to receive the shank 5 of a screw driver blade or other tool, 6, there being a pin 7 extending transversely of said bifurcated end to hold the screw driver blade or other tool in place.

The other end of the member 1 is bifurcated, as shown at 8, the crotch of which bifurcation receives a restricted shank 9 of a hammer poll 10 which is provided with overhanging parts 11. The shank 9 and the overhanging parts 11 (the inner and under faces of which are curved to correspondingly fit the curvature of the jaw member 1) are soldered, brazed or otherwise rigidly connected to the member 1. A thumb screw 12 passes through an opening 13 in one of the forks 14 adjacent the bifurcation 8 and has its restricted end 15 threaded into the opposite fork 16 adjacent said bifurcation 8. The jaw member 2 has its end, corresponding to the end of the member 1 having the bifurcation 8, provided with a bifurcation 17. Riveted to the side of the member 2 by means of a rivet 18 is a leaf spring 19 and adjacent its free end the same is provided with a pin 20, which extends through openings 21 of the forks 22 adjacent the bifurcation 17, and also through any one of the openings 23 of connecting link 24, whereby the jaw member 2 may be adjusted on the connecting link and relative to the opposite jaw member 1. The adjacent faces of said jaw members near the connecting link are provided with serrations 25 to prevent a nut from slipping while being cracked. The opposite faces of one end of the connecting link are provided with recesses 26, in which the shanks 27 of the cutting blades are riveted, by means of the rivet 28. The cutting blades 29 diverge from each other as shown in the cross sectional view of Fig. 4 and are provided with cutting edges 30, which, in Fig. 2, are curved. The cutting blades may be used for chopping or mincing celery, lettuce, meat, cabbage and the like, and also olives and the like in making various delicacies.

The invention having been set forth, what is claimed as new and useful is:—

1. In a device as set forth, a handle comprising two opposing members, a link adjustably and pivotally connecting the adjacent corresponding ends of said members and having a pair of cutting blades at one end diverging from each other, said blades having curved cutting edges.

2. In a device as set forth, a handle comprising two opposing members, a link pivotally connecting the adjacent corresponding ends of said members, said link having a pair of cutting blades at one end diverging from each other and being elongated in side elevation and provided with curved cutting edges.

3. In a device as set forth, a handle consisting of a pair of opposing members, the adjacent ends of said members being bifurcated, a link having a series of openings or apertures, means extending through the bifurcated ends of the members and through the link to pivotally connect said members to the link, whereby said members may be moved longitudinally relatively to each other, and a leaf spring secured to the side of the other member and having a pin passing through the bifurcated end of said member and through any one of the apertures of said link, said link at one end having a pair of diverging cutters.

4. In a device as set forth, a connecting link for two opposing handle members and having at one end a pair of substantially elliptical cutting members diverging from each other and provided with curved cutting edges, a pair of handle members opposing each other, and means pivotally connecting the link to the handle members, whereby the handle members may be moved longitudinally relatively to each other, whereby different portions of the cutting edges may be presented toward the vegetables to be chopped.

5. In a device as set forth, a link having its lower end upon opposite sides thereof provided with cutters, said cutters being substantially elliptical shaped, and extending downwardly and diverging from each other, a handle consisting of a pair of opposing upper and lower elongated members, one end of the lower member being detachably pivotally connected to the link adjacent said cutters, the upper elongated handle member being substantially in parallelism with the other handle member, and having one end connected to the upper end of said link, whereby a limited pivotal action may be afforded, which pivotal action, together with aforesaid pivotal connection, permitting said member to be moved longitudinally relatively to each other, whereby different portions of the cutting edges may be presented toward the vegetables to be chopped.

In testimony whereof I have signed my name to this specification in the presence of two subscribing witnesses.

JAMES A. HATHAWAY.

Witnesses:
JAMES E. MURPHY,
SYLVANUS E. TAYLOR.